(12) United States Patent
Ozawa

(10) Patent No.: US 11,473,347 B2
(45) Date of Patent: Oct. 18, 2022

(54) FLAP OPENING AND CLOSING MECHANISM

(71) Applicant: SUBARU CORPORATION, Tokyo (JP)

(72) Inventor: Hiroshi Ozawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 300 days.

(21) Appl. No.: 16/942,991

(22) Filed: Jul. 30, 2020

(65) Prior Publication Data

US 2021/0079697 A1  Mar. 18, 2021

(30) Foreign Application Priority Data

Sep. 18, 2019 (JP) .............................. JP2019-168941

(51) Int. Cl.
*B60K 15/05* (2006.01)
*E05B 83/34* (2014.01)
(Continued)

(52) U.S. Cl.
CPC .......... *E05B 83/34* (2013.01); *E05B 63/0056* (2013.01); *B60K 15/05* (2013.01); *B60K 2015/053* (2013.01); *B60K 2015/0515* (2013.01); *B60K 2015/0561* (2013.01); *B60K 2015/0576* (2013.01); *B60L 53/16* (2019.02); *E05B 63/22* (2013.01); *E05Y 2900/534* (2013.01)

(58) Field of Classification Search
CPC ...... E05B 83/34; E05B 63/0056; E05B 63/22; E05Y 2900/534; B60K 15/05; B60K 2015/0515; B60K 2015/053; B60K 2015/0561; B60K 2015/0576; B60L 53/16
See application file for complete search history.

(56) References Cited

U.S. PATENT DOCUMENTS 5,664,811 A * 9/1997 Martus ................ E05B 47/0046
  292/144
7,185,938 B2 * 3/2007 Beck ...................... B60K 15/05
  292/207
(Continued)

FOREIGN PATENT DOCUMENTS

JP  2006-177087 A  7/2006

*Primary Examiner* — Nicolas A Arnett
(74) *Attorney, Agent, or Firm* — Smith, Gambrell & Russell, LLP

(57) ABSTRACT

A flap opening and closing mechanism includes a flap and a lock member. The flap includes a first engagement member, and is pivotally supported on a vehicle body side. The flap opens and closes an opening in an outer plate of a vehicle body. The lock member locks the flap. The lock member includes a body to be mounted on the vehicle body side, a swing member pivotally supported on the body, a second engagement member, and an adjustor. The second engagement member is engaged with the first engagement member, and provided in the swing member. The adjustor allows for a rotational movement of the body about a rotation shaft of the swing member to the vehicle body in a state where the body is temporarily fixed to the vehicle body side. The lock member locks the swing member at a position corresponding to the closing position of the flap.

16 Claims, 7 Drawing Sheets

(51) Int. Cl.
*E05B 63/00* (2006.01)
*E05B 63/22* (2006.01)
*B60L 53/16* (2019.01)

(56) References Cited

U.S. PATENT DOCUMENTS

| | | | | |
|---|---|---|---|---|
| 7,914,063 B2* | 3/2011 | Lederer | .................. | B60K 15/04 |
| | | | | 292/207 |
| 8,677,690 B2* | 3/2014 | Lee | ........................ | E05B 83/34 |
| | | | | 49/324 |
| 8,870,241 B2* | 10/2014 | Lee | ........................ | E05B 83/34 |
| | | | | 292/144 |
| 11,235,659 B2* | 2/2022 | Dvorak | ............... | E05B 47/0004 |
| 2003/0222476 A1* | 12/2003 | Park | ....................... | B60K 15/05 |
| | | | | 296/97.22 |
| 2012/0313382 A1* | 12/2012 | Lee | ........................ | E05B 83/34 |
| | | | | 292/144 |
| 2018/0162219 A1* | 6/2018 | Lee | ........................ | B60K 15/05 |

* cited by examiner

FLAP OPENING AND CLOSING MECHANISM

CROSS-REFERENCE TO RELATED APPLICATIONS

The present application claims priority from Japanese Patent Application No. 2019-168941 filed on Sep. 18, 2019, the entire contents of which are hereby incorporated by reference.

BACKGROUND

The disclosure relates to a flap opening and closing mechanism configured to, by a flap pivotally supported on a vehicle body side, open and close an opening of a recess (in which, for example, either one of a fuel injection port and a charging port of an external power supply is disposed) that is formed in an outer plate of a vehicle body.

Japanese Unexamined Patent Application (JP-A) No. 2006-177087 proposes a flap opening and closing mechanism that includes a flap pivotally supported via a shaft member to open and close an opening of a recess in which a fuel injection port is disposed. A latch for locking a protrusion protruding from a back surface of the flap is disposed in a case via a rotation shaft. In the flap opening and closing mechanism described in JP-A No. 2006-177087, the recess is open at an outer surface of a rear fender of an automobile vehicle. The case is fixed to a side wall of the recess. A substantially U-shaped locking groove is formed at a tip of the latch to hold the protrusion of the flap. The flap is locked at a position where the flap closes the opening.

SUMMARY

An aspect of the disclosure provides a flap opening and closing mechanism. The mechanism includes a flap and a lock member. The flap is pivotally supported on a vehicle body side. The flap is configured to open and close an opening formed in an outer plate of a vehicle body. The flap includes a first engagement member. The lock member is capable of locking the flap at a closing position where the flap closes the opening. The lock member includes a body, a swing member, a second engagement member, and a position adjustor. The body is configured to be mounted on the vehicle body side. The swing member is pivotally supported on the body. The second engagement member is configured to be engaged with the first engagement member of the flap. The second engagement member is provided in the swing member. The position adjustor is configured to allow for a rotational movement of the body about a rotation shaft of the swing member with respect to the vehicle body in a state where the body is temporarily fixed to the vehicle body side. The lock member is configured to lock the swing member at a lock position corresponding to the closing position of the flap.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In the flap opening and closing mechanism described in JP-A No. 2006-177087, when the case and the flap are assembled to the vehicle body side with various errors in components, the closing position where the flap is locked by the latch may deviate from a desired position. When the closing position of the flap deviates from the outer plate of the vehicle body, the appearance of the vehicle may be impaired, which may reduce the product competitiveness.

It is desirable to provide a flap opening and closing mechanism capable of adjusting a position of the flap with respect to the outer plate to a desired position even when there are various errors in components.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
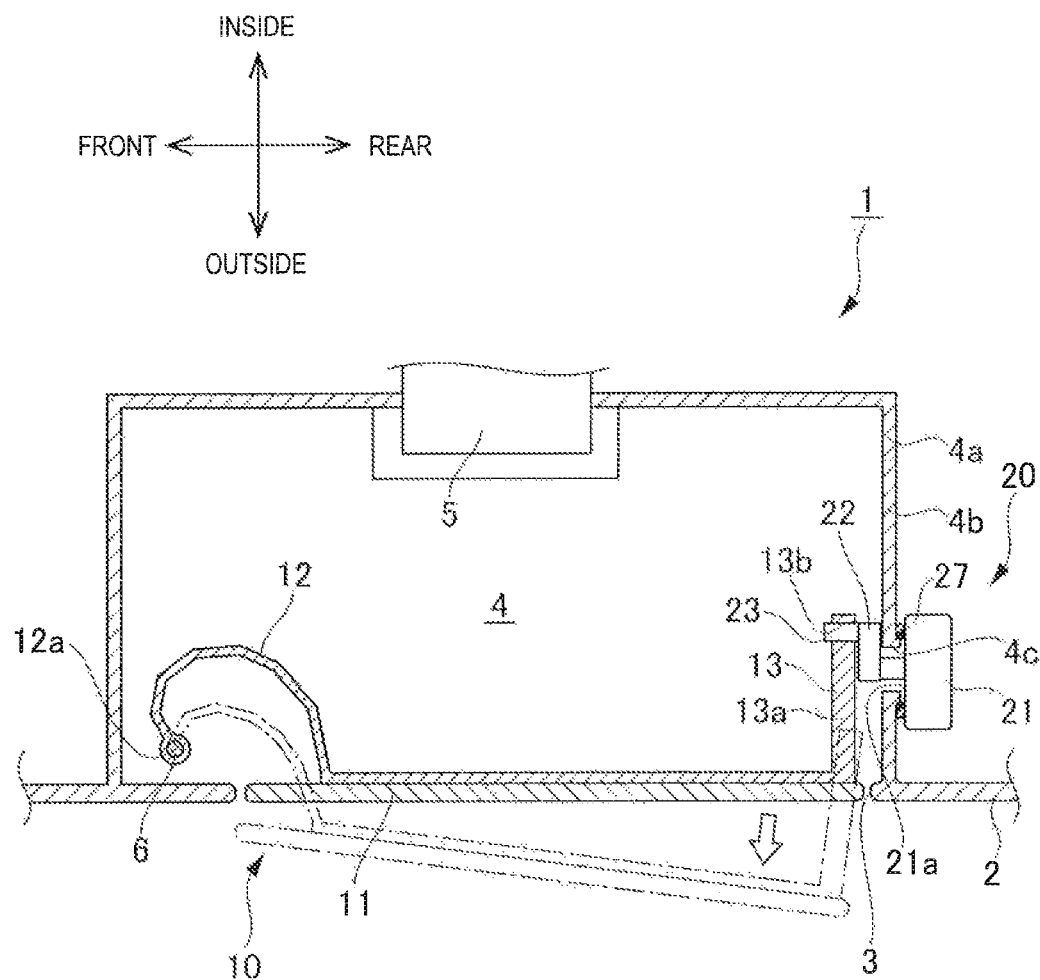
FIG. 1 is a plan cross-sectional view illustrating a flap opening and closing mechanism according to an embodiment of the disclosure.
Figure 2:
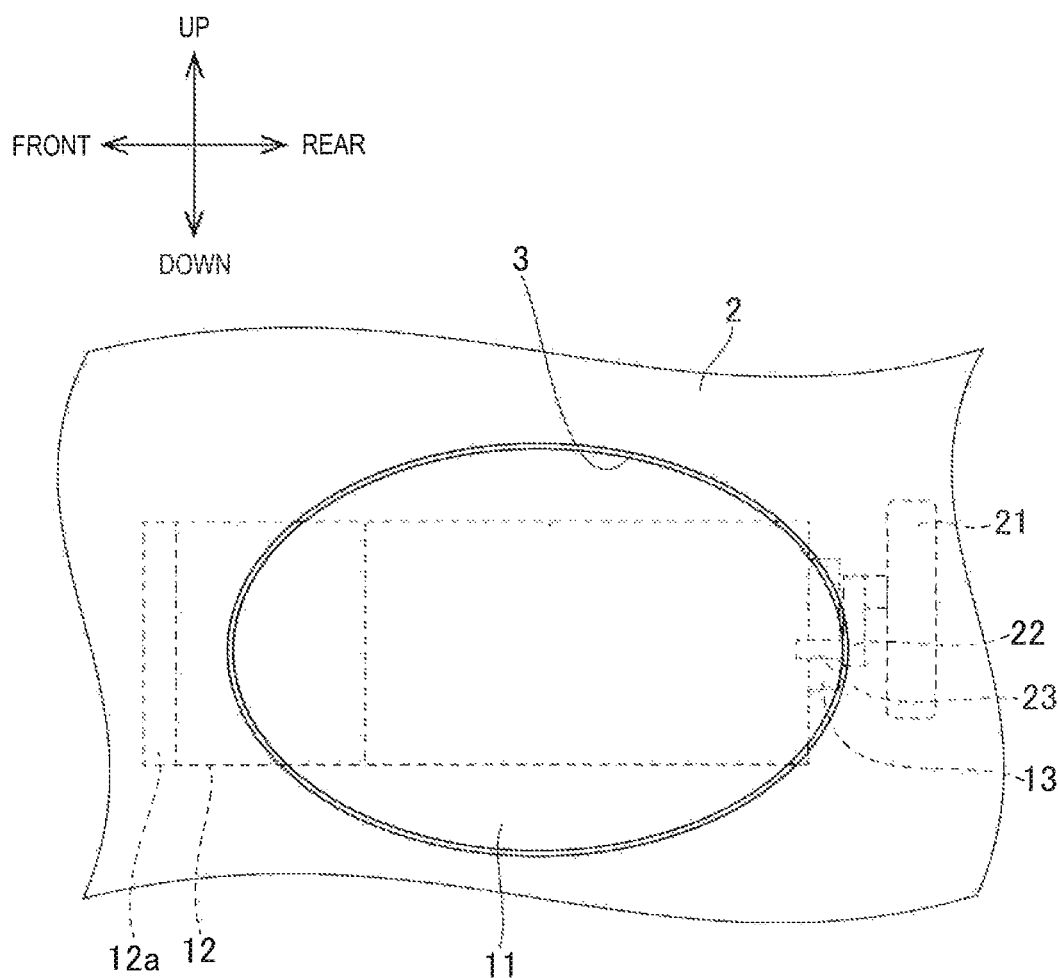
FIG. 2 is a side view illustrating the flap opening and closing mechanism in a state where an opening in an outer plate of a vehicle body is closed by a flap.
Figure 3:
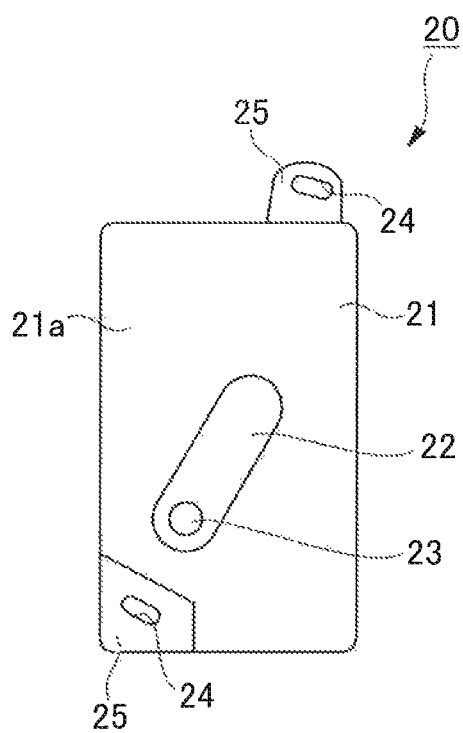
FIG. 3 is a front view illustrating a lock member.
Figure 4:
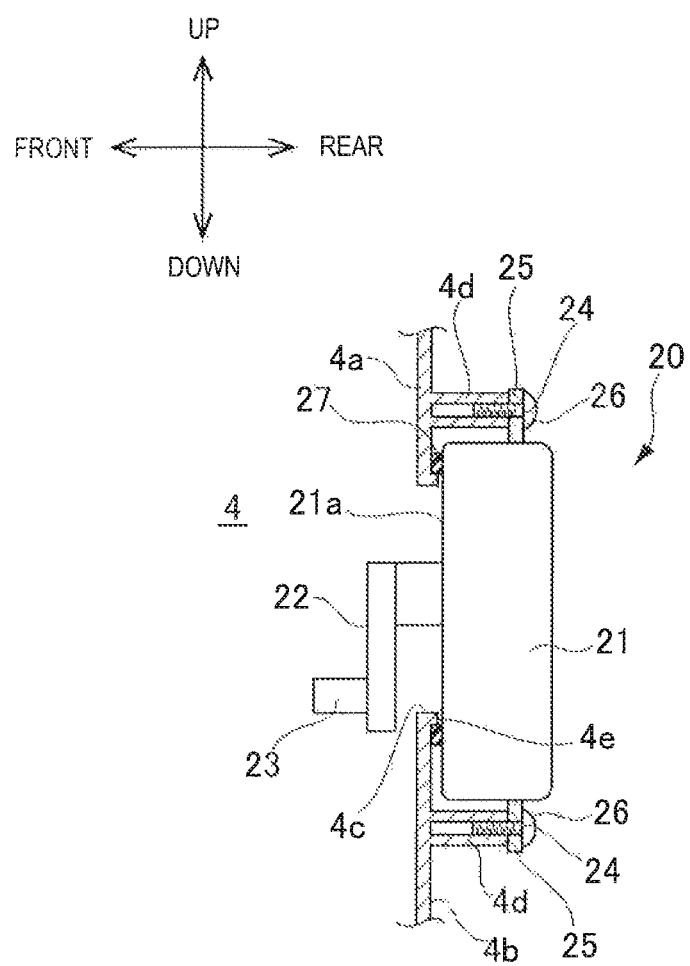
FIG. 4 is a partial side view of the flap opening and closing mechanism and illustrates a state where the lock member is installed at a wall of the vehicle body.
Figure 5:
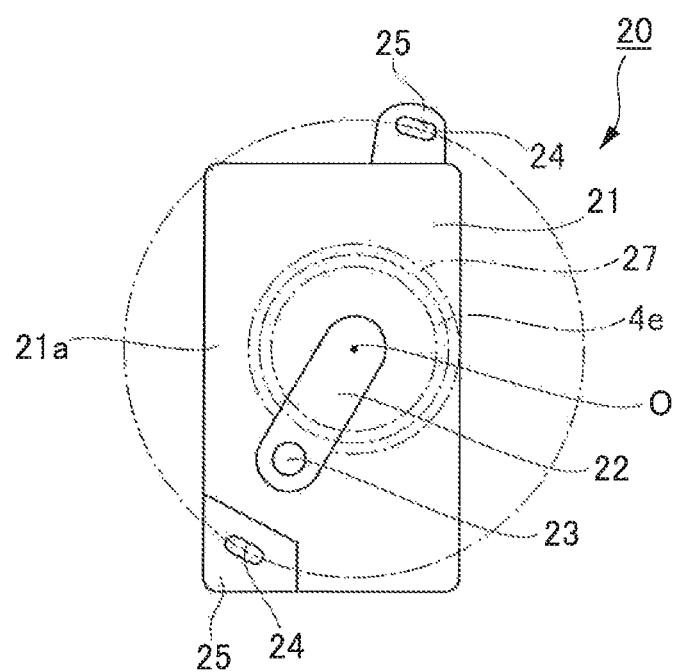
FIG. 5 is a diagram illustrating a relationship among a boss, a packing, a mounting hole, and an arm of the lock member.
Figure 6:
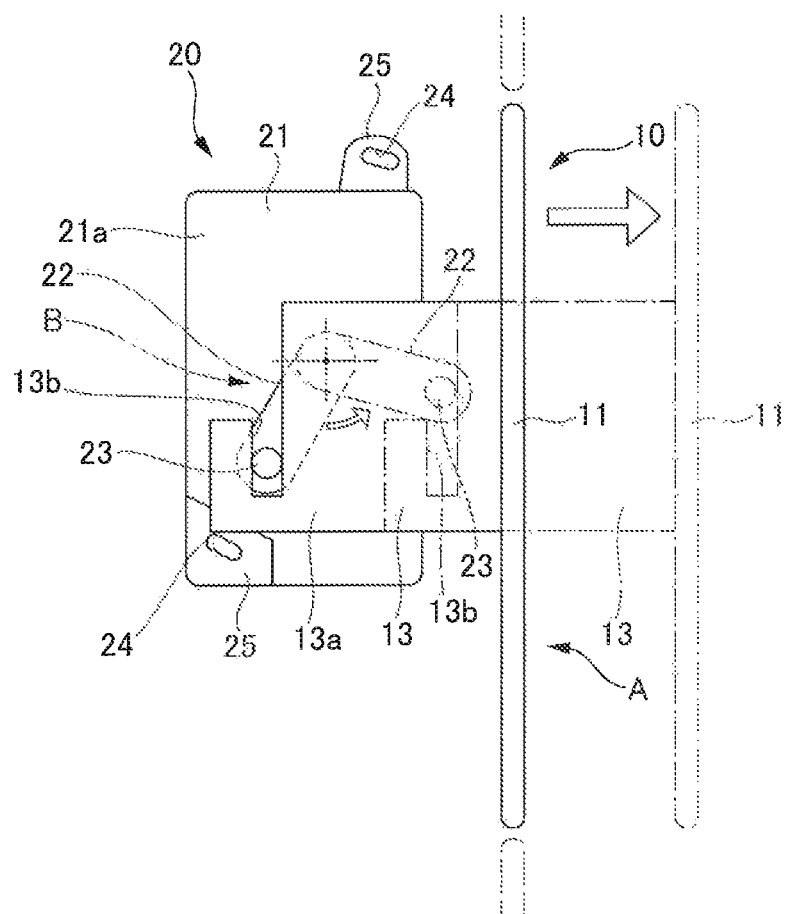
FIG. 6 is a diagram illustrating a state where the arm of the lock member and the flap move in conjunction with each other.
Figure 7:
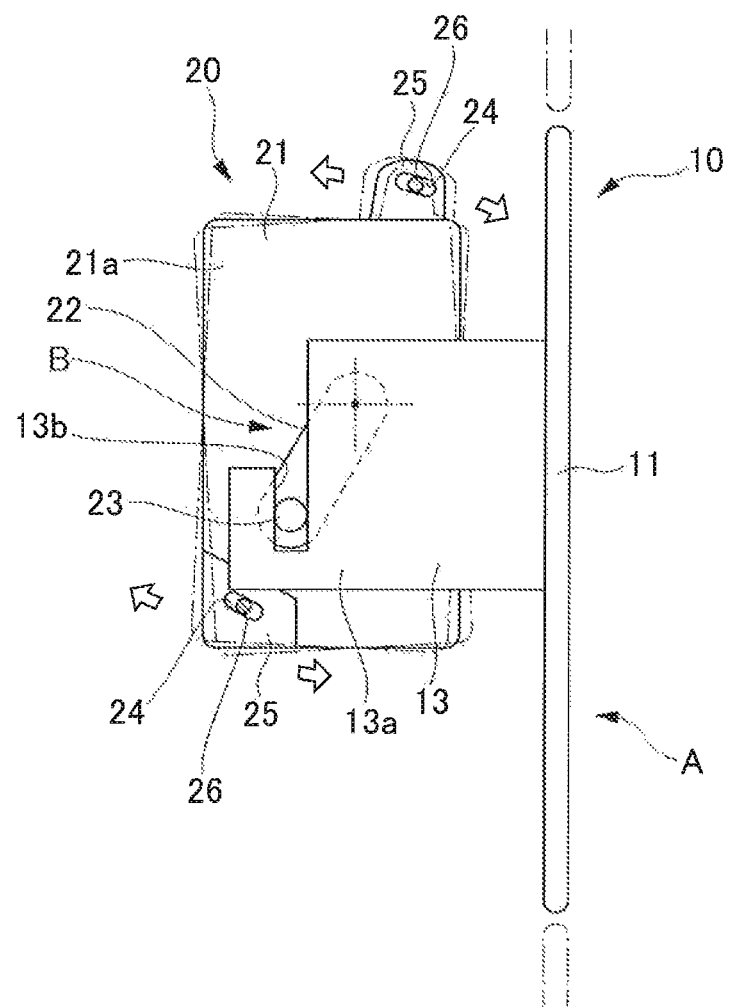
FIG. 7 is a diagram illustrating an adjustable range of the body of the lock member when the flap is at a closing position.

FIGS. 1 to 7 illustrate an embodiment of the disclosure. FIG. 1 is a plan cross-sectional view illustrating a flap opening and closing mechanism according to an embodiment of the disclosure. FIG. 2 is a side view illustrating the flap opening and closing mechanism in a state where an opening in an outer plate of a vehicle body is closed by a flap. FIG. 3 is a front view illustrating a lock member. FIG. 4 is a partial side view of the flap opening and closing mechanism and illustrates a state where the lock member is installed at a wall of the vehicle body. FIG. 5 is a diagram illustrating a relationship among a boss, a packing, a mounting hole, and an arm of the lock member. FIG. 6 is a diagram illustrating a state where the arm of the lock member and the flap move in conjunction with each other. FIG. 7 is a diagram illustrating an adjustable range of the body of the lock member when the flap is at a closing position.

As illustrated in FIG. 1, a flap opening and closing device 1 includes an opening 3 for fueling, a flap 10, and a lock member 20. The opening 3 is formed in an outer plate 2 of a vehicle body of an automobile vehicle. The flap 10 is pivotally supported on a vehicle body side. The flap 10 opens and closes the opening 3. The lock member 20 can lock the flap 10 at a closing position A where the flap 10 closes the opening 3. The vehicle body has a recess 4 that is opened and closed by the flap 10. A fill opening 5 is disposed in the recess 4. When the flap 10 which is locked by the lock member 20 is unlocked, the flap 10 can move outward from the closing position A in a vehicle width direction. In the present embodiment, the flap 10 can be pushed inward in the vehicle width direction by a predetermined distance from the closing position.

As illustrated in FIG. 2, the flap 10 includes a flap body 11, a hinge 12, and a first engagement member 13. The flap body 11 is a part of a design surface integrally with the outer plate 2 when the flap body 11 is at the closing position A. The hinge 12 couples the flap body 11 and a pivotal support member 6 at a vehicle body 1 side to each other. The first engagement member 13 is provided on the flap body 11. The first engagement member 13 is engageable with a second engagement member of the lock member 20. In the present embodiment, as illustrated in FIG. 1, the pivotal support member 6 is spaced apart from the flap body 11 at one side in a front-rear direction in the recess 4. The pivotal support member 6 includes a shaft member extending substantially in an up-down direction. That is, in the present embodiment, a rotation shaft direction of the flap 10 is substantially the up-down direction. The hinge 12 extends from one end portion (for example, a front end portion) in the front-rear direction on a back surface of the flap body 11 toward the pivotal support member 6. The hinge 12 has an insertion hole 12a at one end portion (for example, a front end portion) of the hinge 12 in the front-rear direction. The insertion hole 12a extends substantially in the up-down direction. The pivotal support member 6 is inserted into the insertion hole 12a.

The first engagement member 13 is formed at the other end portion (for example, a rear end portion) in the front-rear direction on the back surface of the flap body 11. The first engagement member 13 has a protruding plate 13a and a groove 13b. The protruding plate 13a protrudes from the back surface of the flap body 11. The groove 13b is formed in the protruding plate 13a. The groove 13b extends in a predetermined direction. That is, the hinge 12 is formed at the one end portion of the flap 10 in the front-rear direction. The first engagement member 13 is formed at the other end portion of the flap 10 in the front-rear direction. The front-rear direction is substantially perpendicular to the rotation shaft direction of the flap 10. The groove 13b receives a pin 23 of the lock member 20. The pin 23 moves in the groove 13b in accordance with rotation of the flap 10. In one embodiment, the pin 23 may serve as a "second engagement member". In the present embodiment, the groove 13b is opened at the top and extends substantially in the up-down direction. The pin 23 extends substantially in the front-rear direction.

As illustrated in FIG. 3, the lock member 20 includes a body 21, an arm 22, and the pin 23. The body 21 is mounted on a wall 4a (see FIG. 4). The wall 4a is one (for example, rear-side one) of walls of the recess 4 of the vehicle body that are opposed to each other in the front-rear direction. One end portion of the arm 22 is pivotally supported on the body 21. In one embodiment, the arm 22 may serve as a "swing member". The pin 23 is provided at the other end portion of the arm 22. The body 21 is formed in a substantially box shape. The arm 22 is disposed on a main surface 21a facing the recess 4. As illustrated in FIG. 4, the body 21 includes mounting plates 25 each having a mounting hole 24. The body 21 is mounted on the wall 4a by screws 26 inserted into the mounting holes 24. In the present embodiment, the body 21 is provided on a back surface 4b of the wall 4a. The arm 22 and the pin 23 are disposed in the recess 4 through a hole 4c formed in the wall 4a.

The arm 22 extends along the main surface 21a of the body 21. The arm 22 swings about a rotation shaft perpendicular to the main surface 21a. The arm 22 can be locked at a lock position B (see FIG. 6) corresponding to the closing position A (see FIG. 6) of the flap 10. In the present embodiment, an urging force is applied to the arm 22 in one of swinging directions (for example, outward in the vehicle width direction). When the arm 22 locked at the lock position B is pushed to the other of the swinging directions (for example, inward in the vehicle width direction) against the urging force, the arm 22 is unlocked, and the arm 22 moves to the one of the swinging directions by the urging force. Further, when the arm 22 is pushed in the other of the swinging directions from the one of the swinging directions beyond the lock position B against the urging force, and then moves in the one of the swinging directions and reaches the lock position B due to the urging force, the arm 22 is locked again. The pin 23 is provided at the other end portion of the arm 22. The pin 23 protrudes towards a side opposite to the body 21. In the present embodiment, the pin 23 is formed in a substantially cylindrical shape. The pin 23 extends in a direction perpendicular to the main surface 21a.

A protrusion 4d is formed on the back surface 4b of the wall 4a. The protrusion 4d is in contact with the mounting plate 25 of the body 21 and is screwed with the screw 26. As illustrated in FIG. 5, in the present embodiment, the two mounting holes 24 and the two mounting plates 25 are provided. Each mounting hole 24 is formed in an arc-shaped elongated hole centered on a rotation center O of the arm 22. In the present embodiment, each mounting hole 24 allows for a rotational movement of the body 21 about the rotation shaft of the arm 22 with respect to the vehicle body in a state where the body 21 is temporarily fixed to the vehicle body side. In one example, the mounting hole 24 may serve as a "position adjustor".

As illustrated in FIG. 4, an annular packing 27 is interposed between the back surface 4b of the wall 4a and the main surface 21a of the body 21. The packing 27 is made of rubber to, for example, form a watertight seal between inside and outside of the wall 4a. As illustrated in FIG. 5, in the present embodiment, the packing 27 is formed in a ring shape centered on the rotation center O of the arm 22. The wall 4a has a boss 4e protruding from the back surface 4b. The boss 4e is in contact with an inner periphery of the packing 27. The boss 4e is formed in a cylindrical shape centered on the rotation center O of the arm 22. In the present embodiment, the boss 4e is formed on a periphery of the hole 4c.

In the flap opening and closing device 1 configured as described above, as illustrated in FIG. 6, as the pin 23 moves in the groove 13b, the arm 22 and the flap 10 rotate and move in conjunction with each other in a predetermined movement range including the closing position A and the lock position B. To move the flap 10 from the closing position A for the purpose of fueling, maintenance, or the like, the arm 22 which is locked by the lock member 20 is unlocked, so that the flap 10 can be moved outward in the vehicle width direction. As illustrated in FIG. 6, when the arm 22 moves to the one of the swinging directions by a predetermined distance, the engagement between the pin 23 and the groove 13b is released, and the flap 10 can rotate independently from the lock member 20. When the fueling, maintenance, or the like is completed, the flap 10 is moved inward in the vehicle width direction, and the arm 22 is locked at the lock position B, so that the flap 10 is locked at the closing position A.

According to the flap opening and closing device 1 of the present embodiment, the mounting hole 24 of the body 21 is formed in the elongated hole. Therefore, as illustrated in FIG. 7, the screw 26 is allowed to move in the mounting hole 24, and the installation position of the body 21 on the wall 4a can be adjusted. At this time, since the mounting hole 24 has the arc shape centered on the rotation center of the arm 22, the body 21 rotates and moves about the rotation center O of the arm 22. That is, during adjustment of the position of the body 21, the position of the pin 23 of the lock member 20 is not deviated from the trajectory of a circle centered on the rotation center of the arm 22, and the adjustment of the position of the body 21 does not adversely affect on the operation of the arm 22 and the flap 10.

In the present embodiment, the one end portion of the arm 22 is pivotally supported on the body, and the pin 23 is provided at the other end portion of the arm 22. Therefore, a movement distance of the pin 23 in the vehicle width direction is secured while reducing the size of the lock member 20. With such a configuration, a rotation angle of the arm 22 with respect to a movement amount of the pin 23 is relatively large, and the lock position B of the arm 22 is likely to vary in each lock member 20. According to the present embodiment, the position adjustor can absorb the variation of the lock position B of the arm 22, which otherwise tends to be relatively large.

Accordingly, even when the lock position B of the arm 22 varies due to various errors of components constituting the lock member 20, the lock position B can be adjusted to correspond to the closing position A during mounting of the lock member 20 to the vehicle body side. With regard to the flap 10, when the closing position A of the flap body 11 is deviated from the design surface of the outer plate 2 due to an error or the like, the closing position A can be adjusted to correspond to the lock position B. In this way, even when the components have various errors, the position of the flap 10 with respect to the outer plate 2 can be adjusted to a desired position.

According to the present embodiment, the packing 27 is formed in the ring shape centered on the rotation center of the arm 22. Therefore, when the body 21 rotates and moves with respect to the vehicle body side, even if the body 21 and the packing 27 move relative to each other, the positional relationship between the body 21 and the packing 27 does not change, and the water-tightness is not adversely affected. The boss 4e is formed in the cylindrical shape centered on the rotation center of the arm 22. Therefore, when the body 21 rotates and moves with respect to the vehicle body side, the packing 27 is allowed to move in the rotation direction, and the packing 27 is not detached due to an excessive load applied thereto.

In the above embodiment, the second engagement member of the lock member 20 has the pin 23, and the first engagement member 13 of the flap 10 has the groove 13b. It is needless to say that alternatively, the second engagement member of the lock member may have a groove, and the first engagement member of the flap may have a pin.

In the above embodiment, the arm 22 is used as the swing member. Alternatively, the shape of the swing member may be appropriately changed, for example, a cam-shaped member may be used as the swing member.

In the above embodiment, the rotation shaft direction of the flap 10 is the up-down direction, and the rotation shaft direction of the arm 22 is the front-rear direction. Alternatively, the direction of each rotation shaft can be appropriately changed according to the installation location of the fill opening of the vehicle.

In the above embodiment, each of the two mounting holes 24 is formed in the arc-shaped elongated hole centered on the rotation center of the arm 22. Alternatively, the number of the mounting holes 24 formed in the elongated hole may be optionally changed. For example, one of the two mounting holes may be an arc-shaped elongated hole that guides the screw in the circumferential direction, and the other mounting hole may be a relatively large hole that allows the screw to move in a plane of the mounting plate. In one embodiment, the mounting hole 24 may serve as a "position adjustor". In the above embodiment, the mounting hole 24 allows the rotational movement of the body 21 about the rotation shaft of the arm 22 with respect to the vehicle body. Alternatively, in one embodiment, a part or a member other than the mounting holes may serve as a "position adjustor". For example, in one embodiment, a protrusion and a groove may serve as a "position adjustor". The protrusion is formed on one of the body and the wall. The groove is formed in the other of the body and the wall. The groove has an arc shape centered on the rotation center of the arm. The groove receives the protrusion.

In the above embodiment, the fill opening 5 is disposed in the recess 4. Alternatively, for example, a charging port may be disposed in the recess 4. That is, the disclosure is applicable to any mechanism if the mechanism includes a flap that opens and closes an opening of a recess formed in an outer plate of a vehicle body and that is pivotally supported on the vehicle body side.

The embodiment of the disclosure has been described above. It is noted that the embodiment described above does not limit the disclosure. It is also noted that not all combinations of the features described in the embodiment are essential to a solution to a problem of the disclosure.

According to the disclosure, the position adjustor allows for the rotational movement of the body of the lock member around the rotation shaft of the swing member with respect to the vehicle body. Therefore, when the position of the body of the lock member is adjusted, the position of the second engagement member of the lock member does not deviate from the trajectory of the circle centered on the rotation center of the swing member. The adjustment of the position of the lock member body does not adversely affect on the operation of the swing member and the flap.

Accordingly, even when the lock position of the swing member varies due to various errors of the components constituting the lock member, the lock position can be adjusted to correspond to the closing position of the flap during mounting of the lock member to the vehicle body side.

Therefore, even when there are various errors in the components, the position of the flap with respect to the outer plate can be adjusted to a desired position.

The invention claimed is:
1. A flap opening and closing mechanism comprising:
a flap pivotally supported on a vehicle body side, the flap being configured to open and close an opening formed in an outer plate of a vehicle body, the flap comprising a first engagement member; and a lock member capable of locking the flap at a closing position where the flap closes the opening, the lock member comprising
a body configured to be mounted on the vehicle body side,
a swing member pivotally supported on the body,
a second engagement member configured to be engaged with the first engagement member of the flap, the second engagement member being provided in the swing member, and
a position adjustor configured to allow for a rotational movement of the body about a rotation shaft of the swing member with respect to the vehicle body in a state where the body is temporarily fixed to the vehicle body side,
the lock member being configured to lock the swing member at a lock position corresponding to the closing position of the flap.

2. The flap opening and closing mechanism according to claim 1, wherein
the swing member comprises an arm extending in a predetermined direction,
one end portion of the arm is pivotally supported on the body, and
the second engagement member is provided at the other end portion of the arm.

3. The flap opening and closing mechanism according to claim 2, wherein
the body is mounted to the vehicle body side through a screw member inserted in a mounting hole formed in either one of the body and the vehicle body side,
the mounting hole is an arc-shaped elongated hole centered on a rotation center of the swing member, and
the mounting hole constitutes the position adjustor.

4. The flap opening and closing mechanism according to claim 3, wherein
one of the second engagement member of the lock member and the first engagement member of the flap comprises a pin, and
the other of the second engagement member of the lock member and the first engagement member of the flap is formed with a groove configured to receive the pin.

5. The flap opening and closing mechanism according to claim 4, wherein
the body of the lock member is mounted on a back surface of a wall at the vehicle body side via a packing,
the swing member and the pin are disposed in a space at a front surface side of the wall via a hole formed in the wall, and
the packing is formed in a ring shape centered on the rotation center of the swing member.

6. The flap opening and closing mechanism according to claim 5, wherein
the wall comprises a boss protruding from the back surface and is in contact with an inner periphery of the packing, and
the boss is formed in a cylindrical shape centered on a rotation center of the arm.

7. The flap opening and closing mechanism according to claim 2, wherein
one of the second engagement member of the lock member and the first engagement member of the flap comprises a pin, and
the other of the second engagement member of the lock member and the first engagement member of the flap is formed with a groove configured to receive the pin.

8. The flap opening and closing mechanism according to claim 7, wherein
the body of the lock member is mounted on a back surface of a wall at the vehicle body side via a packing,
the swing member and the pin are disposed in a space at a front surface side of the wall via a hole formed in the wall, and
the packing is formed in a ring shape centered on the rotation center of the swing member.

9. The flap opening and closing mechanism according to claim 8, wherein
the wall comprises a boss protruding from the back surface and is in contact with an inner periphery of the packing, and
the boss is formed in a cylindrical shape centered on a rotation center of the arm.

10. The flap opening and closing mechanism according to claim 1, wherein
the body is mounted to the vehicle body side through a screw member inserted in a mounting hole formed in either one of the body and the vehicle body side,
the mounting hole is an arc-shaped elongated hole centered on a rotation center of the swing member, and
the mounting hole constitutes the position adjustor.

11. The flap opening and closing mechanism according to claim 10, wherein
one of the second engagement member of the lock member and the first engagement member of the flap comprises a pin, and
the other of the second engagement member of the lock member and the first engagement member of the flap is formed with a groove configured to receive the pin.

12. The flap opening and closing mechanism according to claim 11, wherein
the body of the lock member is mounted on a back surface of a wall at the vehicle body side via a packing,
the swing member and the pin are disposed in a space at a front surface side of the wall via a hole formed in the wall, and
the packing is formed in a ring shape centered on the rotation center of the swing member.

13. The flap opening and closing mechanism according to claim 12, wherein
the wall comprises a boss protruding from the back surface and is in contact with an inner periphery of the packing, and
the boss is formed in a cylindrical shape centered on a rotation center of the arm.

14. The flap opening and closing mechanism according to claim 1, wherein
one of the second engagement member of the lock member and the first engagement member of the flap comprises a pin, and
the other of the second engagement member of tne lock member and the first engagement member of the flap is formed with a groove configured to receive the pin.

15. The flap opening and closing mechanism according to claim 1, wherein
the body of the lock member is mounted on a back surface of a wall at the vehicle body side via a packing,
the swing member and the pin are disposed in a space at a front surface side of the wall via a hole formed in the wall, and
the packing is formed in a ring shape centered on the rotation center of the swing member.

16. The flap opening and closing mechanism according to claim 15, wherein the wall comprises a boss protruding from the back surface and is in contact with an inner periphery of the packing, and the boss is formed in a cylindrical shape centered on a rotation center of the arm.

\* \* \* \* \*